Patented Mar. 29, 1938

2,112,543

UNITED STATES PATENT OFFICE 2,112,543

PREPARATION OF 2.4-DINITRO-6-CYCLO-HEXYL-PHENOL

Ralph F. Prescott, Midland, Mich., assignor to The Dow Chemical Company, Midland, Mich., a corporation of Michigan No Drawing. Application December 31, 1936, Serial No. 118,639

4 Claims. (Cl. 260—143)

The present invention relates to methods for the preparation of 2,4-dinitro-6-cyclohexyl-phenol, and is particularly concerned with an improved method for the nitration of the sulphonic acids of 2-cyclohexyl-phenol.

U. S. Patent No. 1,880,404 describes the compound 2,4-dinitro-6-cyclohexyl-phenol and a method for preparing the same which consists in reacting 2-cyclohexyl-phenol with 2 molecular equivalents of concentrated sulphuric acid to form the sulphonic acid of 2-cyclohexyl-phenol, and subsequently adding the theoretical amount, i. e. 2 molecular equivalents, of nitric acid thereto, whereby the 2,4-dinitro-6-cyclohexyl-phenol is formed. While this is a satisfactory method for the laboratory preparation of the compound, it has been found that in large scale operation certain difficulties are encountered in attempting to follow out the described procedure. Among the disadvantages accruing to the use of the known method are (1) the formation of considerable quantities of a dark red oil during the nitration step, the removal of which from the desired crystalline product can be accomplished only with difficulty and is accompanied by an appreciable diminution of yield, (2) the excessive foaming of the reaction mixture during the addition of the nitric acid with resulting mechanical losses due to overflowing of equipment, etc., (3) the excessive time required for the carrying out of the nitration step, and (4) the poor yields of relatively low grade product obtainable thereby.

Among the objects of this invention are to provide an improved process whereby 2,4-dinitro-6-cyclohexyl-phenol can be prepared in commercial quantities in a high yield and good quality, involving the nitration of the sulphonic acids of 2-cyclohexyl-phenol without the simultaneous production of undesirable oily by-products, and also eliminating foaming of the reaction mixture.

I have discovered that, when 2-cyclohexyl-phenol is reacted with sulphuric acid, and the nitration step subsequently accomplished by the gradual addition of the resultant 2-cyclohexyl-phenol sulfonic acid in diluted form to the entire mass of nitric acid employed, the aforesaid disadvantages of the known process are overcome and 2,4-dinitro-6-cyclohexyl-phenol is obtained in an increased yield and superior quality without the concurrent formation of substantial amounts of oily by-products.

In carrying out my improved method, 1 molecular equivalent of molten 2-cyclohexyl-phenol is run into a minimum of 2 molecular equivalents of cold concentrated sulfuric acid. Agitation is employed throughout this addition and the temperature is allowed to rise to 80°–110° C. Following the addition of the cyclohexyl-phenol the reaction mixture is maintained at 80°–100° C. until the formation of the sulfonic acid derivative is substantially complete, as evidenced by the complete solubility of a small sample thereof in water. An excess of water is thereafter stirred into the sulfonic acid product with vigorous cooling of the mixture throughout such addition. The resulting sulfonic acid solution, preferably at a temperature of below 30° C., is then added slowly to a minimum of about 2.75 molecular equivalents of nitric acid. Nitric acid of 50%–70% concentration and at an initial temperature of below 50° C. has been found particularly suitable for use. The reaction mixture is vigorously agitated and the temperature regulated throughout the sulfonic acid addition, in such a manner that the temperature rises gradually to between 75° and 90° C. at the end. The nitration mixture is thereafter maintained at a temperature of 80°–90° C. for a period sufficient to insure the desired degree of nitration, and is then cooled, filtered, and the resulting crystalline product washed free of acid, and dried.

While a minimum of 2 molecular equivalents of sulphuric acid and 2.75 molecular equivalents of nitric acid are required in the reaction, I preferably employ about 2.5 molecular equivalents of sulphuric and 3 molecular equivalents of nitric acid for each molecular equivalent of cyclohexyl phenol employed. Still greater proportions of nitric and sulphuric acids may be employed if desired, the nitric acid preferably being in molecular excess over the amount of sulphuric acid employed in the sulfonation step.

The following example is illustrative of the application of the principle of my invention, but is not to be construed as limiting the same.

100 pounds (0.568 mol.) of 2-cyclohexyl-phenol were melted and warmed to 60° C. and added with vigorous agitation to 146.5 pounds (1.5 mols) of concentrated sulphuric acid (specific gravity 1.84) over a period of 45 minutes, the acid being initially at a temperature of 25° C. The reaction was exothermic, the temperature of the suphonation mixture increasing to 80° C. at the completion of the phenol addition. The mixture was thereafter heated to 85° C. for 15 minutes, at the end of which time a small sample of the reaction product was found to be completely soluble in water. 439 pounds of water was then stirred into the sulphonation mixture with cooling, whereby there was obtained 685.5 pounds of an aqueous sulphonic acid solution. 150 pounds (1.665 mols) of 70% nitric acid and 71 pounds of water were mixed together in a stainless-steel nitrating vessel equipped with mechanical agitator, cooling and heating coils, and a vent for gases. This nitric acid solution was warmed to approximately 46° C. and the aqueous sulphonic acid solution, at 25° C., added thereto with agitation over a period of 2 hours. Cooling water was continually circulated through the coils of the nitrator during this period at such a rate that the temperature of the reaction mixture gradually increased to a maximum of 80° C. at the end of the addition period. No foaming or localized over-heating of portions of the reaction mixture was observed during the addition of the sulphonic acid solution. The nitration mixture was thereafter vigorously agitated and maintained at 80°–85° C. for 2 hours to insure the completion of the reaction, and was subsequently cooled to below 30° C. The suspended 2,4-dinitro-6-cyclohexyl-phenol product was separated therefrom by dumping the entire reaction mixture into a filter box, whereby the liquor was removed leaving the compound in the form of substantially oil-free yellow granules. This wet product was freed of acid residues by successive washings with warm and cold water, wheeled in a centrifugal drier, and air dried at 65° C. for 8 hours whereby there was obtained 136 pounds (0.512 mol.) of 2,4-dinitro-6-cyclohexyl-phenol as a light yellow granular product melting at 102°–103° C. This represented a yield of approximately 90%, based upon the 2-cyclohexyl-phenol employed.

Attempted plant scale preparation of 2,4-dinitro-6-cyclohexyl-phenol, wherein nitric acid was added to the sulphonated 2-cyclohexyl-phenol solution as taught in the prior art, resulted in the isolation of 30–50% yields of an inferior 2,4-dinitro-6-cyclohexyl-phenol product, orange brown in color, and melting at 85–101° C. This product was badly contaminated with oily by-products which were removable only by recrystallization from organic solvent. The reaction mixture foamed badly during the nitration step and the addition of the nitric acid to the sulphonic acid solution was of necessity extended over an impractically long period of time to prevent as far as possible losses of reaction product thereby. Furthermore the course of the nitration was not smooth, since there was a tendency for high concentrations of nitric acid to build up in the reaction mixture and periodically to react upon the sulphonic acid with great violence, thereby causing boiling and overheating of the reaction mixture.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:—

1. In a method for the preparation of 2,4-dinitro-6-cyclohexyl-phenol, the steps which consist in reacting 2-cyclohexyl-phenol with sulphuric acid to form a sulphonic acid of 2-cyclohexyl-phenol, diluting said sulphonic acid with water, gradually adding the dilute aqueous sulphonic acid solution to an excess of aqueous nitric acid solution at temperatures gradually increasing to 75°–90° C. and thereafter separating 2,4-dinitro-6-cyclohexyl-phenol from the reacted mixture.

2. In a method for the preparation of 2,4-dinitro-6-cyclohexyl-phenol, the steps which consist in reacting one molecular equivalent of 2-cyclohexyl-phenol with a minimum of 2 molecular equivalents of concentrated sulphuric acid to form a sulphonic acid of 2-cyclohexyl-phenol, diluting said sulphonic acid with water, gradually adding the dilute sulphonic acid solution to an aqueous solution containing a minimum of 2.75 molecular equivalents of nitric acid at temperatures gradually increasing to 75°–90° C., and thereafter separating 2,4-dinitro-6-cyclohexyl-phenol from the reacted mixture.

3. In a method for the preparation of 2,4-dinitro-6-cyclohexyl-phenol, the steps which consist in reacting one molecular equivalent of 2-cyclohexyl phenol with approximately 2.5 molecular equivalents of concentrated sulphuric acid to form a sulphonic acid of 2-cyclohexyl-phenol, diluting said sulphonic acid with water, gradually adding the dilute sulphonic acid solution to an aqueous solution of approximately 3.0 molecular equivalents of nitric acid, warming the mixture so obtained at 80°–85° C. for sufficient time to insure completion of the desired degree of nitration, and thereafter separating 2,4-dinitro-6-cyclohexyl-phenol from the reacted mixture.

4. The method of nitrating a sulphonic acid of 2-cyclohexyl-phenol which comprises gradually adding a dilute aqueous solution containing one molecular equivalent thereof to an aqueous solution containing at least 2.75 molecular equivalents of nitric acid at temperatures gradually increasing from below 50° C. to 75°–90° C.

RALPH F. PRESCOTT.